(12) United States Patent
Schmidt et al.

(10) Patent No.: US 9,191,725 B2
(45) Date of Patent: Nov. 17, 2015

(54) METHOD AND APPARATUS FOR STREAMING VIDEO

(71) Applicant: General Instrument Corporation, Horsham, PA (US)

(72) Inventors: Mark S Schmidt, San Diego, CA (US); Paul Moroney, La Jolla, CA (US); Arjun Ramamurthy, San Diego, CA (US)

(73) Assignee: ARRIS Technology, Inc., Suwanee, GA (US)

( * ) Notice: Subject to any disclaimer, the term of this patent is extended or adjusted under 35 U.S.C. 154(b) by 78 days.

(21) Appl. No.: 14/214,206

(22) Filed: Mar. 14, 2014

(65) Prior Publication Data
US 2014/0380376 A1 Dec. 25, 2014

Related U.S. Application Data

(60) Provisional application No. 61/801,420, filed on Mar. 15, 2013.

(51) Int. Cl.
*H04N 21/234* (2011.01)
*H04N 21/2343* (2011.01)
*H04N 21/262* (2011.01)
(Continued)

(52) U.S. Cl.
CPC ........ *H04N 21/8456* (2013.01); *H04L 65/4084* (2013.01); *H04L 65/602* (2013.01); *H04L 65/607* (2013.01); *H04L 65/608* (2013.01); *H04N 21/2343* (2013.01); *H04N 21/2347* (2013.01); *H04N 21/23439* (2013.01); *H04N 21/266* (2013.01); *H04N 21/26258* (2013.01); *H04N 21/438* (2013.01); *H04N 21/4345* (2013.01); *H04N 21/4385* (2013.01); *H04N 21/462* (2013.01); *H04N 21/47202* (2013.01)

(58) Field of Classification Search
None
See application file for complete search history.

(56) References Cited

U.S. PATENT DOCUMENTS

2012/0144445 A1* 6/2012 Bonta et al. ............. 725/116
2012/0278333 A1* 11/2012 Ramachandran et al. .... 707/741
(Continued)

FOREIGN PATENT DOCUMENTS

WO 2012/021645 A1 2/2012
WO 2012/097006 A1 7/2012

OTHER PUBLICATIONS

PCT Search Report & Written Opinion, RE: Application #PCT/US2014/029646; dated Oct. 10, 2014.
(Continued)

*Primary Examiner* — Brian T Pendleton
*Assistant Examiner* — Jean D Saint Cyr
(74) *Attorney, Agent, or Firm* — Thomas A. Ward

(57) ABSTRACT

A method, apparatus, article of manufacture, and a memory structure for a CPT stream to a client device via an HTTP live streaming (HLS) protocol having a plurality of HLS media files is disclosed. In one embodiment, the method comprises generating an HLS playlist specifying a plurality HLS media files before generating any of the HLS media files, wherein each of the plurality of HLS media files has a unique name, transmitting the HLS playlist to the client device, after generating the HLS playlist, transcoding the CPT stream into at least a subset of the plurality of HLS media files, and providing at least one of the subset of plurality of HLS media files to the client device, wherein the at least one of the plurality of HLS media files is a client-requested media file selected from the HLS playlist.

20 Claims, 11 Drawing Sheets

(51) Int. Cl.
*H04N 21/4402* (2011.01)
*H04N 21/845* (2011.01)
*H04N 21/2347* (2011.01)
*H04N 21/266* (2011.01)
*H04N 21/434* (2011.01)
*H04N 21/438* (2011.01)
*H04N 21/4385* (2011.01)
*H04N 21/462* (2011.01)
*H04N 21/472* (2011.01)
*H04L 29/06* (2006.01)

(56) References Cited

U.S. PATENT DOCUMENTS

| | | | | |
|---|---|---|---|---|
| 2012/0278496 A1* | 11/2012 | Hsu | ............................... | 709/231 |
| 2012/0278497 A1* | 11/2012 | Hsu | ............................... | 709/231 |
| 2012/0278833 A1 | 11/2012 | Tam et al. | | |
| 2012/0317605 A1* | 12/2012 | Brogan | ........................ | 725/109 |
| 2013/0111529 A1* | 5/2013 | Yao et al. | ........................ | 725/93 |

OTHER PUBLICATIONS

R. Pantos, "HTTP Live Streaming; draft-pantos-http-live-streaming-10", Oct. 15, 2012, retrieved from URL<http://toold.ietf.org/pdf/draft-pantos-http-live-streaming-10.pdf> on Sep. 29, 2014, 37 pgs.

R. Pantos, "HTTP Live Streaming; draft-pantos-http-live-streaming-03.txt", Apr. 2, 2010, retrieved from URL<http://toold.ietf.org/pdf/draft-pantos-http-live-streaming-03.txt> on Apr. 2, 2010, 22 pgs.

A. Fecheyr-Lippens, "A Review of HTTP Live Streaming", Jan. 22, 2010, retrieved from URL<http://issuu.com/andruby/docs/http_live_streaming> on May 24, 2011, 37 pgs.

\* cited by examiner

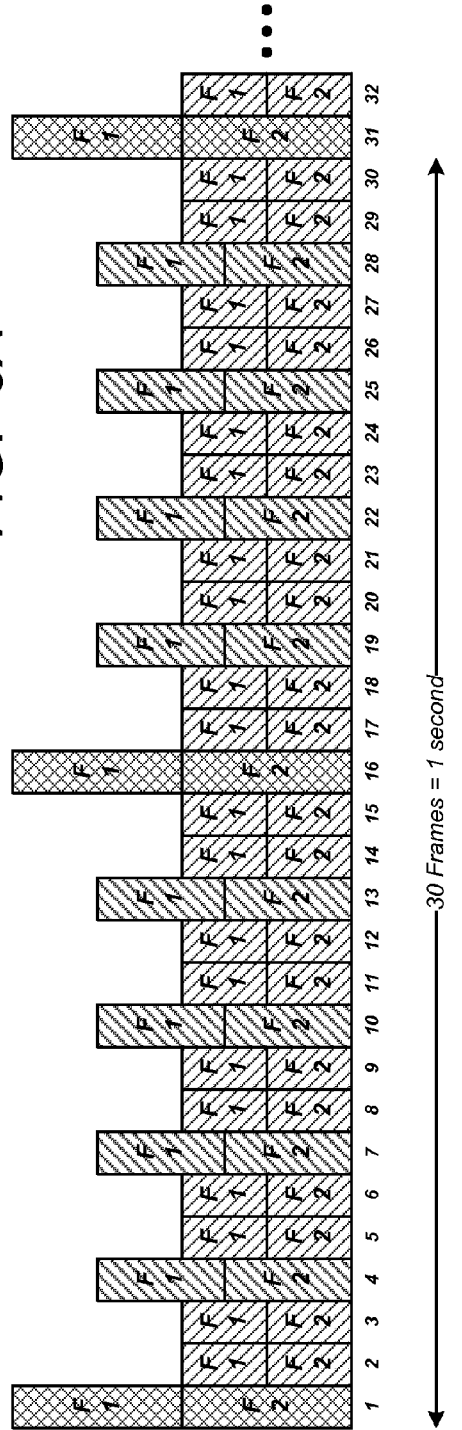
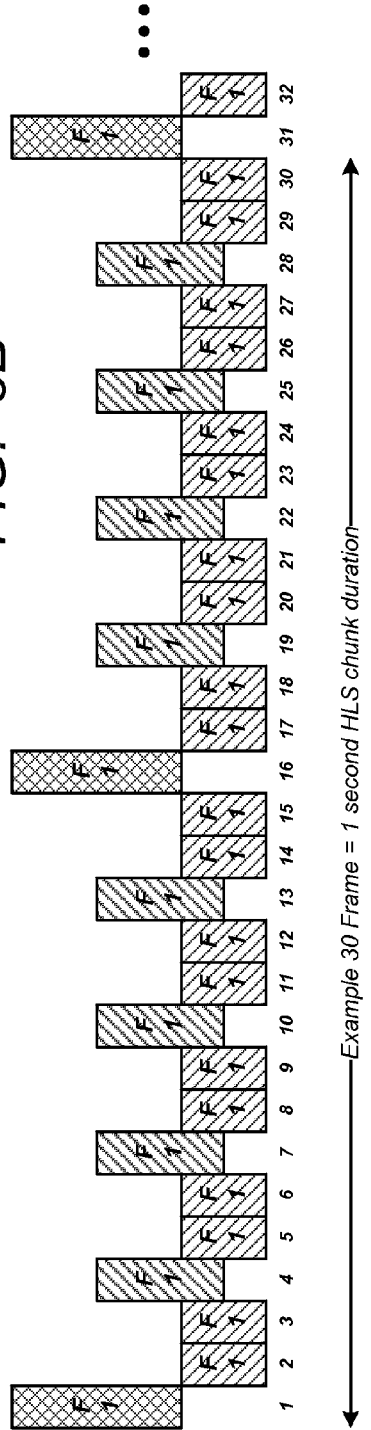

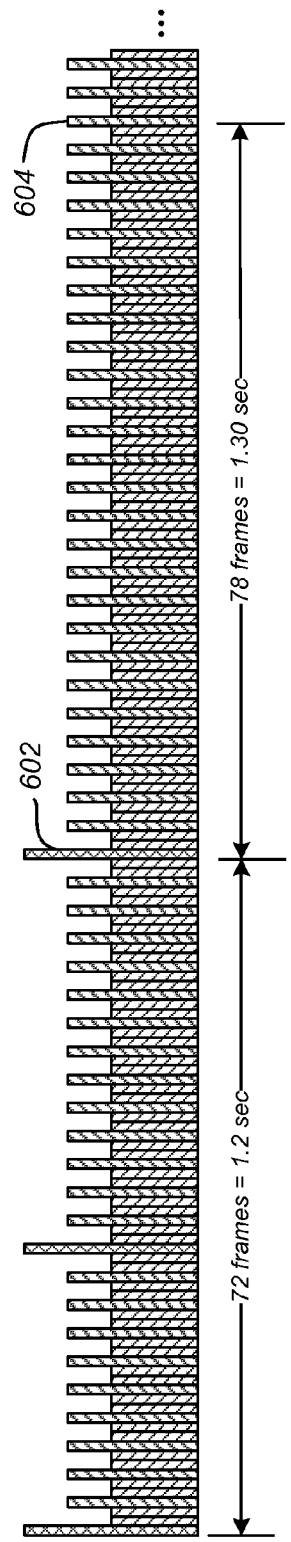
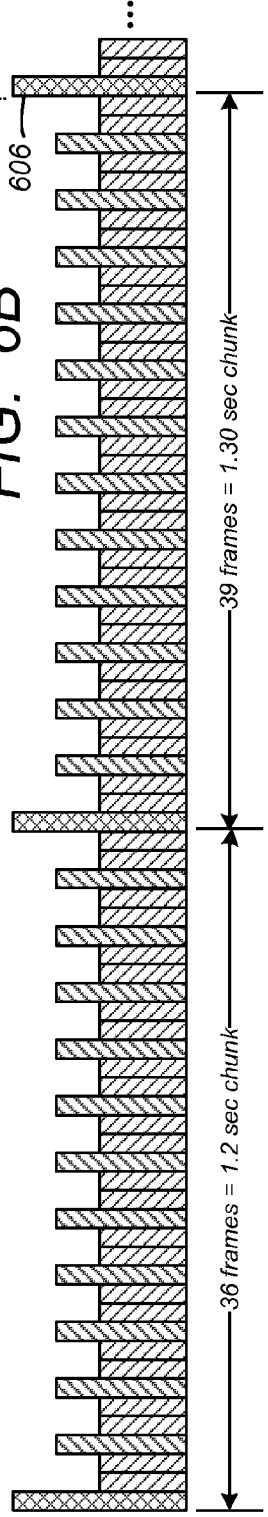

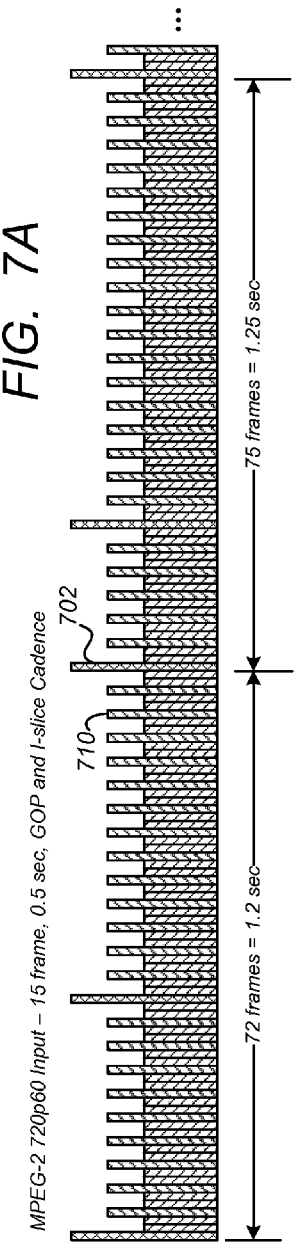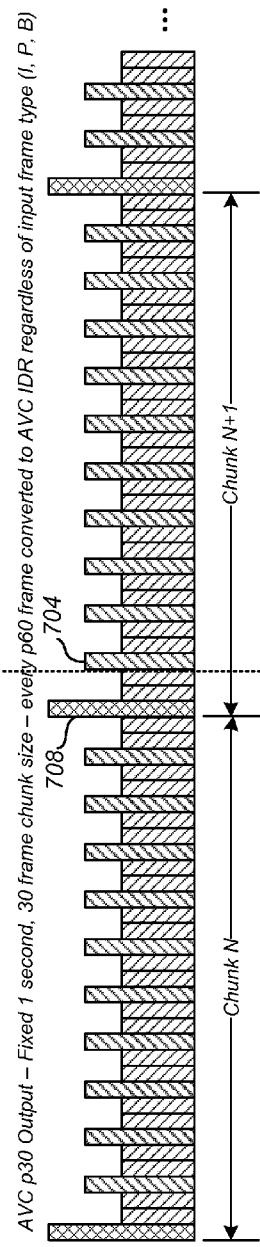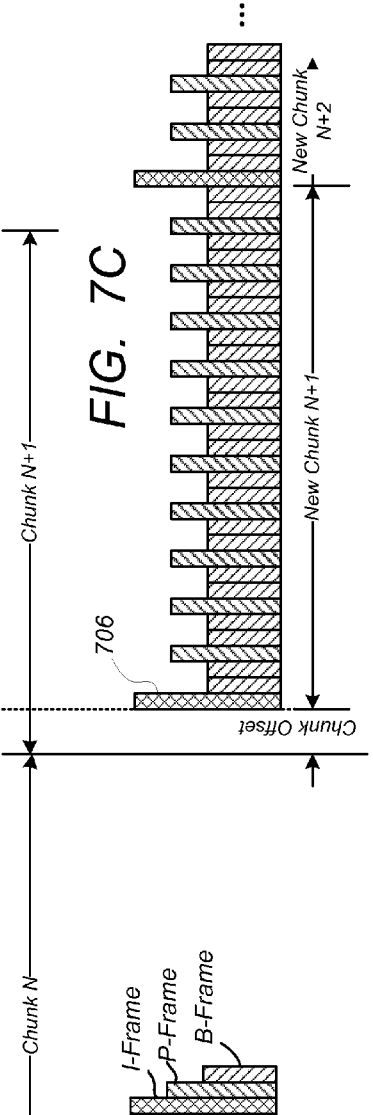

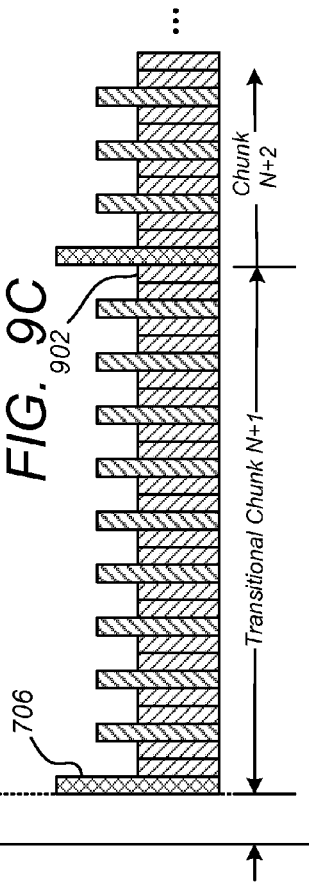
FIG. 9A
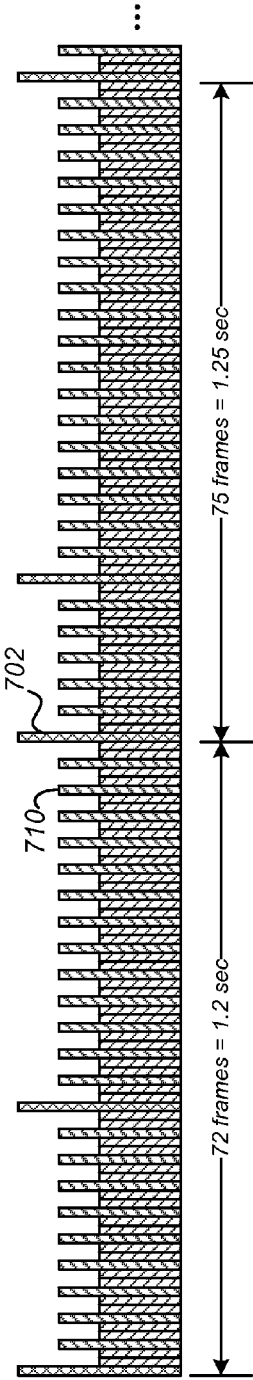
FIG. 9B
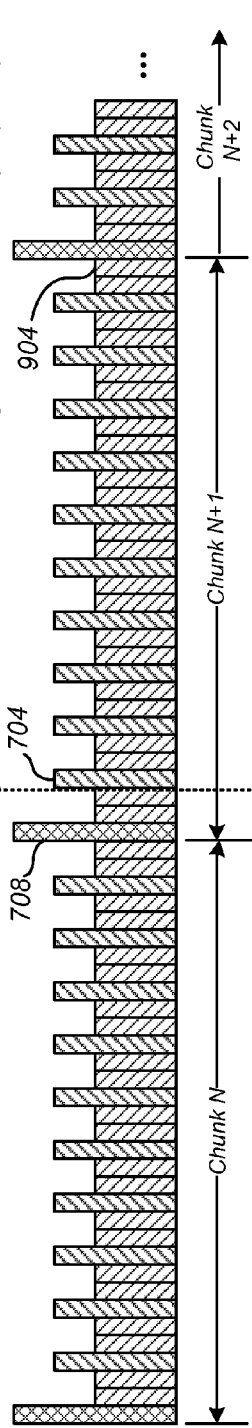
FIG. 9C
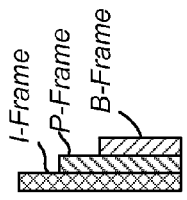

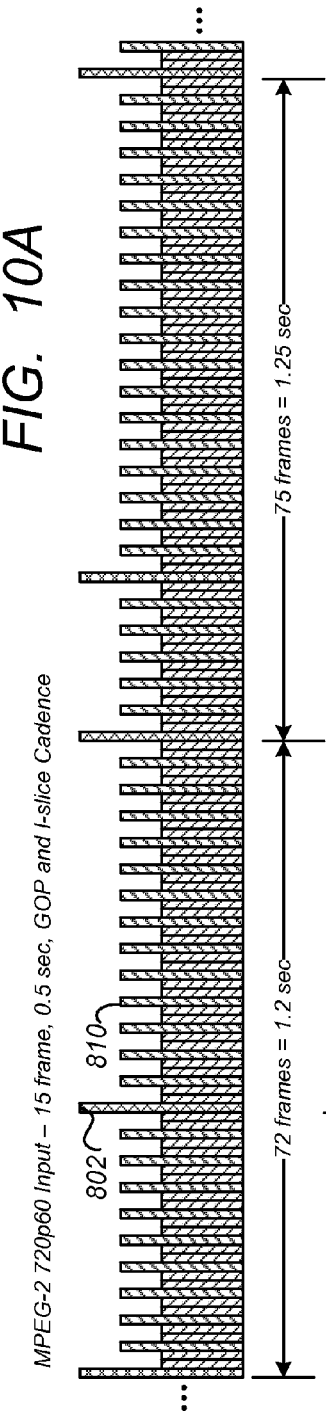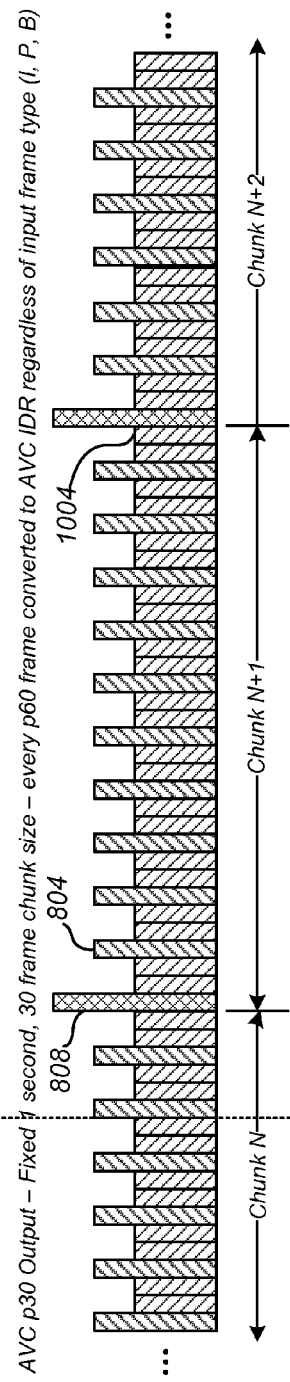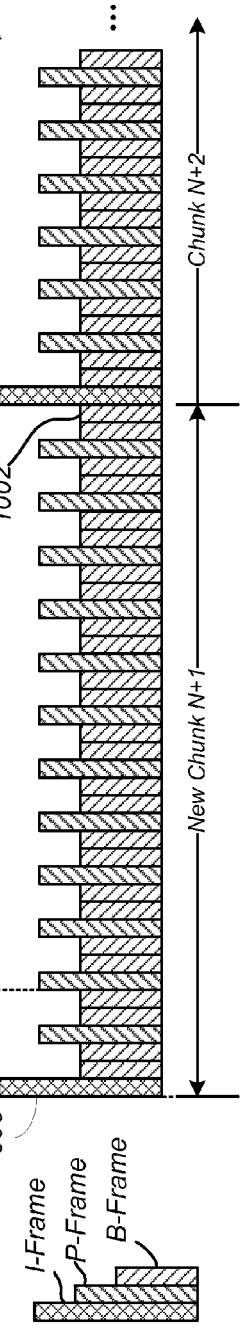

METHOD AND APPARATUS FOR STREAMING VIDEO

CROSS-REFERENCE TO RELATED APPLICATIONS

This application claims benefit of U.S. Provisional Patent Application No. 61/801,420, entitled "STREAMING HLS FROM AN MPEG2 VIDEO FORMAT GATEWAY DVR," by Paul Moroney, Mark Schmidt, and Arjun Ramamurthy, filed Mar. 15, 2013, which application is hereby incorporated by reference herein.

BACKGROUND OF THE INVENTION

1. Field of the Invention

This specification relates to systems and methods for the provision of audiovisual information, and in particular to a system and method for providing a compressed packetized transport (CPT) stream such as moving picture experts group (MPEG) compliant streams to a device via a live streaming protocol.

2. Description of the Related Art

Compression technologies have made the storage and transmission of media programs having audiovisual information to consumers feasible. Such video compression techniques (hereinafter generically referred to as compressed packetized transport (CPT) techniques typically break the media program into a plurality of frames that are compressed using spatial and/or temporal encoding techniques. Typically, some of the frames are identified as index (or I) frames, which are only spatially encoded also known as Intra-coded. Such frames can be decoded without requiring data from any of the other frames, and serve as a datum for other frames. Other frames (known as predictive or P-frames) also use temporal compression techniques, wherein the data recorded for the frame represent changes from an earlier frame. Since frame-to-frame differences are often small, such frames are substantially more efficiently compressed than the I-frames. P-frames, however, cannot be decoded without reference to another (e.g. I) frame. Still other frames (known as bi-predictive or B-frames) also use spatial and temporal compression, but obtain their values from multiple frames. B-frames offer higher compression than I-frames or P-frames, but must reference those frames to be reproduced. MPEG-2, MPEG-3, MPEG-4, H.264, H.265, and AVC are examples of CPT paradigms.

Compressed media programs can be transmitted via satellite, cable, terrestrial wireless transmission, or the Internet, or received in analog form and compressed locally. Once received by a suitable device such as a set top box (STB) or receiver, the media programs may be decoded and/or decrypted (if encoded and/or encrypted by the headend or source of the media program) and provided to a display device for presentation to the user.

Such media programs may also be locally recorded for later playback using devices such as a digital video recorder (DVR), which may be integrated with the receiver or a separate device. Such recordings are typically stored on a large capacity storage device such as a hard disk drive (HDD).

DVRs typically include a first-in-first-out (FIFO) buffer that stores media programs as they are received and plays them back a short time later, subject to user control. This provides a "live pause" capability that allows the user to pause the playback of the received media program, with the FIFO buffer continuing to store received data as it is received. When the user thereafter selects "play," playback from the FIFO is resumed. The FIFO buffer is typically implemented by the same hard disk drive (HDD) used to permanently store media programs, as though separate memory devices may be used.

Many customers desire media programs to be provided for display in more than one place in their homes. In the past, this has required use of a plurality of receivers, one in each location where service is desired. This requires the use of additional expensive hardware, and also the installation of cabling within the home that is suitable for high throughput data transmission. However, recent years have seen the emergence of Gateway receivers that receive media programs and provide them to a plurality of display devices located throughout the home. Since such transmission is of typically lower bandwidth, cabling of reduced transmission throughput or wireless transmission becomes feasible.

Transmission from a gateway receiver can be performed either via simple downloading, progressive downloading or streaming. Simple downloading transfers a media file of data to the remote playback device in any convenient (and not necessarily temporal) order, hence the client typically cannot begin playback of the media program until the entire media file has been received. Progressive downloading transmits data at the temporal beginning of a media file and continues downloading the file sequentially and consecutively until completed at the temporal end of the media program. Playback can commence once sufficient information has been downloaded to support playback.

Streaming delivers media content continuously for concurrent and immediate playback by the device. Unlike progressive downloading, streaming media can be delivered on-demand or live. Streaming also allows the viewer to navigate any point in the media program (even to a temporal point after the current playback position) via navigation requests received from the media player. Streaming paradigms can also adaptively respond to changes in the transmission channel bandwidth. Some paradigms accomplish this via messaging between the media player and the server.

HLS (HTTP Live Streaming) is a type of streaming protocol typically used with mobile devices such as QUICKTIME or iOS compliant devices. HLS operates by breaking a media program down into a number of smaller HTTP-transmittable media files sometimes known as "chunks" that are to be provided to the media player. A manifest or playlist is generated and provided to the media player before playback begins. The playlist indicates the appropriate temporal sequence of the chunks, and the address where the chunks may be obtained from the device serving them, such as a gateway receiver. Chunks may be generated with transcoding parameters that are appropriate for different transmission and display systems (e.g. different frame rates, resolutions, and scan paradigms), thus resulting in multiple chunks that represent the same temporal portions of the media program (albeit, with different frame rates, resolutions, or scan paradigm). The appropriate sequence and address of such chunks may also be provided, permitting the media player to adapt to changing transmission channel bandwidth by simply requesting the appropriate chunks.

However, for gateway applications, the transcoding parameters are critical to the user experience. Generally, the chunks created under the HLS protocol are of varying temporal length. This can result in chunks that are of as much as 10 seconds or more, which affects the user experience when attempting to navigation or trick play operations (e.g. fast forward, skip, reverse), as navigation can only generally be performed to a particular chunk, not within a chunk. HLS also does not guarantee that a chunk will be defined that has an index or I-frame. This is not particularly problematic, so long as the media player receives and decodes all of the data without errors. But if the media player loses sufficient data because of transmission channel or other problems, the media player will not be able to recover and continue decoding the media stream until it receives another I-frame. If a chunk were 10 seconds or more in temporal length and lacked an I-frame, that would result in a significant gap in the media program as presented by the media device. It is possible transcode the media stream so as to include more I-frames, but this results in compression inefficiencies for the reasons described above, and this still does not guarantee that there is an I-frame in each chunk. It is also possible to define chunks to be of very short temporal duration, but doing so increases the size of the playlist and how often it must be updated. Further, very small chunk sizes may affect attempts to measure the channel performance, as the transmit time of groups of data may be disguised by other factors, hence of little use.

Accordingly, there is a need for improved methods and systems for transcoding CPT data into HLS-compliant and similar protocols. The present invention satisfies that need.

SUMMARY OF THE INVENTION

To address the requirements described above, the present invention discloses a method, apparatus, article of manufacture, and a memory structure for a CPT stream to a client device via an HTTP live streaming (HLS) protocol having a plurality of HLS media files. In one embodiment, the method comprises generating an HLS playlist specifying a plurality of HLS media files before generating any of the HLS media files, wherein each of the plurality of HLS media files has a unique name, transmitting the HLS playlist to the client device, after generating the HLS playlist, transcoding the CPT stream into at least a subset of the plurality of HLS media files, and providing at least one of the subset of plurality of HLS media files to the client device, wherein the at least one of the plurality of HLS media files is a client-requested media file selected from the HLS playlist. Another embodiment is evidenced by an apparatus comprising a processor and a memory coupled to the processor that stores processor instructions for performing the above operations.

BRIEF DESCRIPTION OF THE DRAWINGS

Referring now to the drawings in which like reference numbers represent corresponding parts throughout:

FIGS. 3A and 3B are diagrams illustrating decimation of a 1080i60 coded stream into a p30 frame rate cadence during transcoding;

FIGS. 6A and 6B are diagrams illustrating the generation of the I-frame from the P-frame;

FIG. 7A-7C are diagrams further illustrating the generation of further HLS chunks in response to a client request;

FIGS. 9A-9C and 10A-10C are diagrams illustrating another technique of handling chunk offsets.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Media Streaming System

Figure 1:
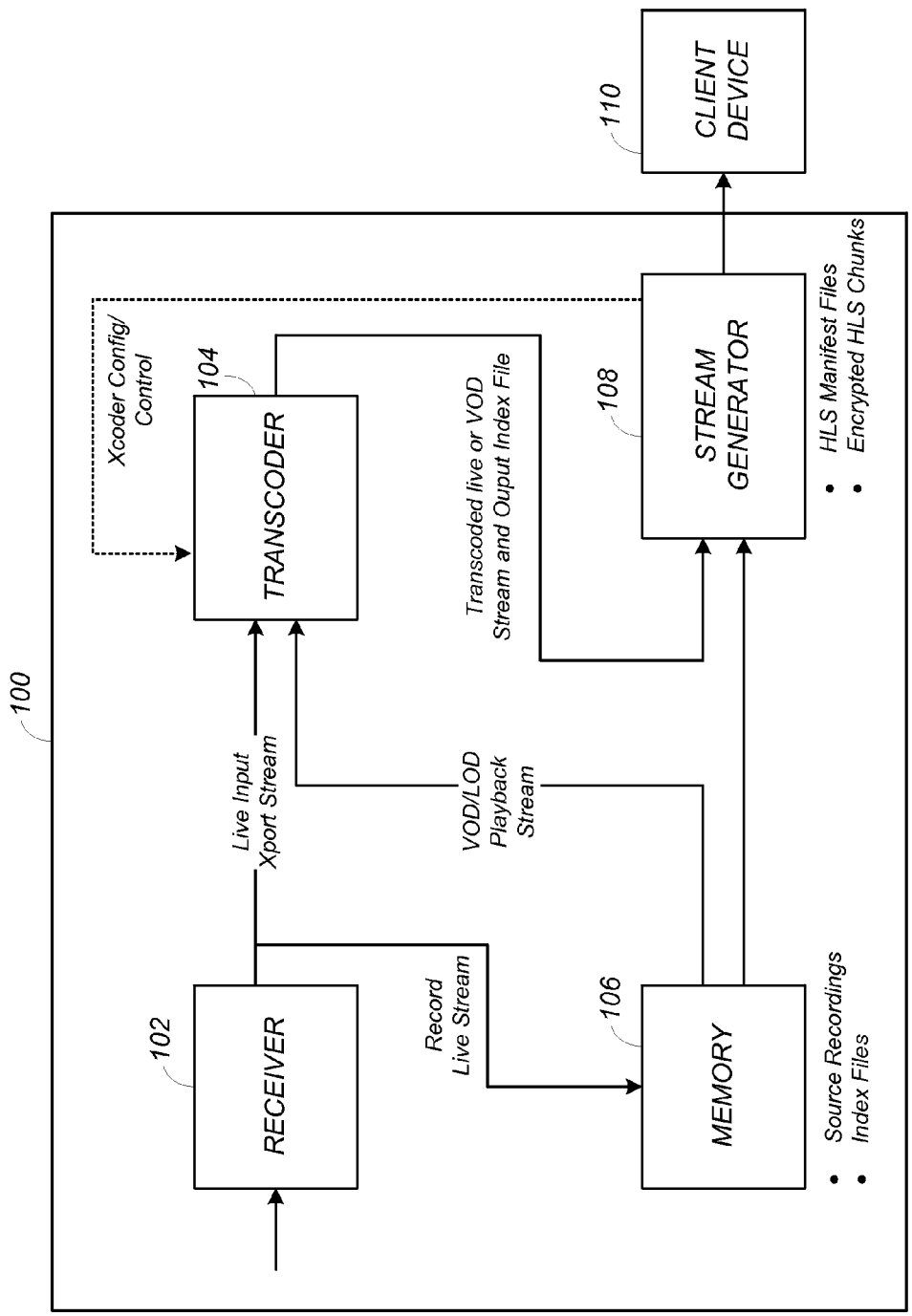
FIG. 1 is a diagram illustrating an embodiment of an exemplary media streaming system or gateway.

FIG. 1 is a diagram of an exemplary media streaming system 100 (alternatively referred to hereinafter as gateway 100). The gateway 100 comprises a receiver 102, a transcoder 104, a memory device 106, and a stream generator 108.

The receiver 102 receives media program information and provides the received media program embodied in a media transport stream. In one embodiment, the receiver 102 receives a an frequency-division multiple access (FDMA) modulated wireless signal from a satellite or terrestrial transmitter, and demodulates that signal to produce a plurality of data packets that are selected and assembled to produce the stream. In another embodiment, the receiver comprises a cable receiver, which may also be provided a FDMA modulated signal, although not wireless and at different frequencies. The receiver may also comprise a computer or similar device that receives the media program from a source such as the Internet via a modem or similar device.

The media program is typically provided in the form of a media transport stream. The media transport stream is typically a CPT stream, and hence comprises a plurality of compressed data packets that include information regarding frames or slices of a media program. In one embodiment, the transport stream complies with an MPEG format, but the transport stream may comply with other compression protocols and techniques.

The memory device 106 receives the CPT stream, and stores the stream for later recovery and playback. Typically, the memory device 106 is random access memory (RAM) device which permits concurrent writing and reading operations at a rate sufficient for storing and retrieving audiovisual information at the same time, implementing the FIFO buffer described above for "live pause" functionality as well as storing media programs for later playback. The memory device 106 is typically a hard disk drive (HDD), but can be implemented using electronic devices or by optical means as well. Typically, the CPT stream is indexed before storage on the memory device 106, so that desired portions of the media program can be located and retrieved. This indexing is used, for example, to support trick play operations such as pause, skip forward, fast reverse, and fast forward.

The transcoder 104 transcodes the CPT stream (as received from the receiver 102 or the memory 106) into the desired streaming format for presentation at the client playback device 110. In one embodiment, the transcoder transcodes streams from the native CPT stream to streams with different encoding paradigms (e.g. AVI) or into streams with the same encoding paradigm, but different encoding parameters as further described above. For example, the transcoder 104 may transcode a 1080i60 native CPT stream into a 740p30 stream or vice versa as well as transcode the result of this transcoding operation into HLS.

The stream generator 108 controls the transcoder 104, processes any index files to create HLS playlists (e.g. .m3u8 files, also alternatively referred to as manifests), generates the HLS "chunk" media files from the transcoded media stream. The media file chunks are made available at an address noted in the HLS playlist. The client playback device 110 uses the address to retrieve the media file chunks. If necessary, the media file chunks may be encrypted and transmitted to the client playback device 110 in encrypted form. The product of the stream generator 108 is the HLS playlist or manifest and optionally encrypted HLS chunks. As shown in FIG. 1, media streams stored in the memory device 106 may also be provided to the stream generator 108 without transcoding.

HLS Playlist Generation

Figure 2:
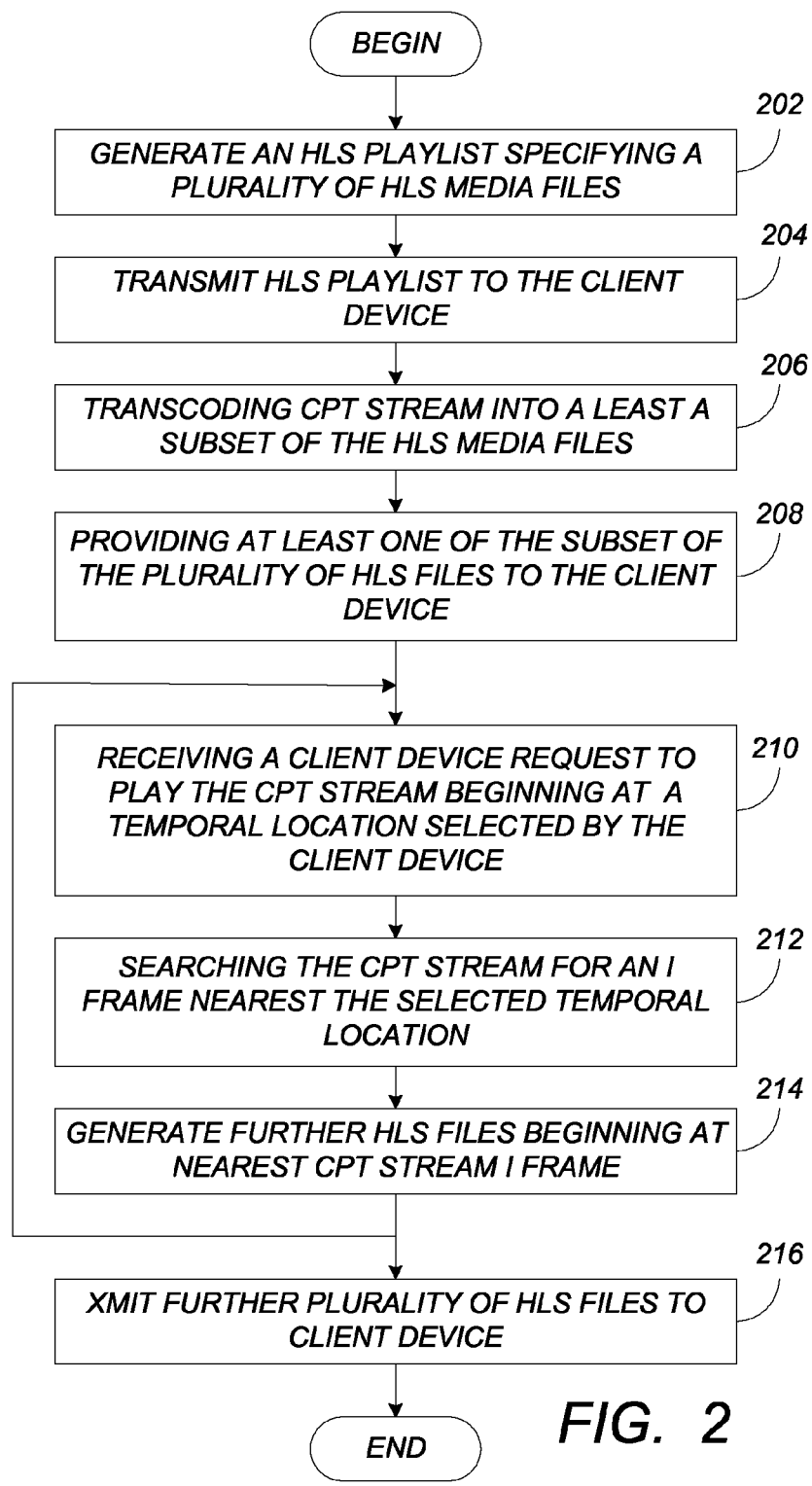
FIG. 2 is a diagram illustrating exemplary process steps that can be used to generate media streams using the gateway.

FIG. 2 is a diagram illustrating exemplary process steps that can be used with the media streaming system 100. In block 202, an HLS playlist is generated and provided an address for use by the HTTP protocol. For example, the generated HLS playlist uniform resource locator (URI) may be of the form "http://example.com/lo/prog_index.m3u8". Typically, the generation of HLS chunks precedes the generation of the HLS playlist, as the chunks may be of different duration. However, in one embodiment, the HLS playlist identifying the chunks is generated before the chunks themselves. Although not necessary, the HLS playlist can be generated using the index generated from the storage of the media stream on the memory device 106, and it can be assumed apriori that each of the generated chunks be of substantially equal temporal length, as described further below. Each of the files references in the playlist has a unique name. For example, a HLS playlist may be generated that identifies the following N media files by including the following addresses, even though the media files for segments 1-N have yet to be generated:

http://media.example.com/segment1.ts
http://media.example.com/segment2.ts
http://media.example.com/segment3.ts
http://media.example.com/segment4.ts
. . .
http://media.example.com/segmentN.ts Each chunk or media segment is given a unique name (in the foregoing example, segment1-segmentN). Once generated, the HLS playlist can be transmitted to the client device 110, as shown in block 204. This can take place before or after the transcoding operations described below.

Transcoding

In blocks 206 and 208, the CPT stream is transcoded into at least a subset of the plurality of HLS media files, and at least a subset of those plurality of HLS media files are provided to the client device 110. For example, in the example shown above, the CPT stream temporally associated with segments 1-3 may be transcoded, or all of the CPT stream may be transcoded into segments 1-N.

Before transcoding into HLS, the CPT stream can be transcoded into an appropriate format for transmission such transcoding can from a 1080i60 format to a 720p60 or 720p30 format, then into the HLS chunks. When generating the HLS chunks, two general approaches are possible: (1) generating chunks with I-frames that temporally match, or nearly match, the location of the I-frames in the index file associated with the media program, or (2) generating chunks of a substantially constant temporal length regardless of the temporal location of the I-frames within the CPT stream.

First Chunk Generation Technique

Matching Chunks to I-Frames of Native Stream

The first technique typically results in HLS chunks that are of variable size. This still permits the generation of a playlist before the chunks themselves, because the chunk duration information included in the playlist can be determined from the index file for the stored CPT stream, so long as fractional sizes employed. Since each chunk generated using this technique will begin with an I-frame, and I-frames include sufficient information to reproduce a frame without reference to other frames, this technique supports trick play operations, such as seeking to a particular temporal location within the media program.

This approach is well matched to the streaming of completed recordings, where there is a full index file to work from, as opposed to live channels. It also works well for 1080i60 inputs, where the frame rate is 30 fps, which matches to the output frame rate, but presents issues when used with a 720P60 input.

FIGS. 3A and 3B are diagrams illustrating the typical decimation of 1080i60 (depicted in FIG. 3A) to a p30 frame rate cadence (depicted in FIG. 3B) during transcoding.

Figure 4A:
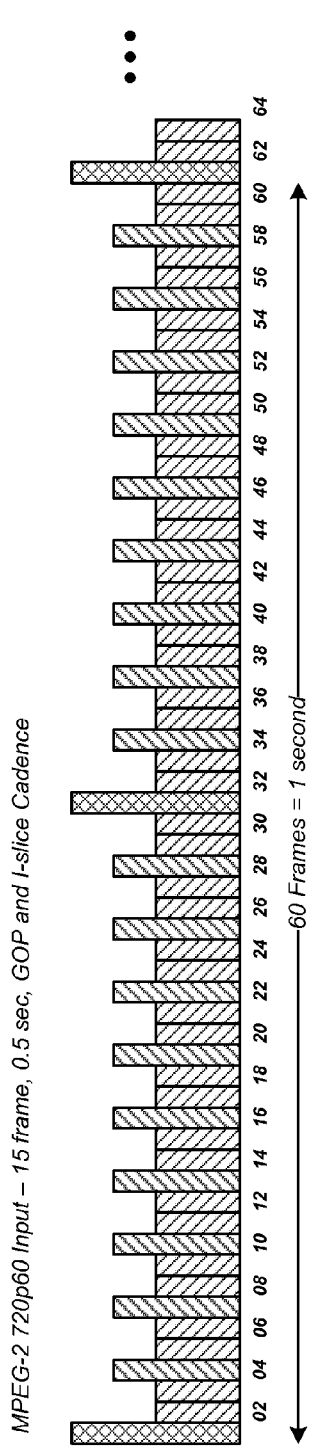
FIGS. 4A and 4B are diagrams illustrating decimation from a 720p60 coded stream to an advanced video coding (AVC) p30 output stream.
Figure 4B:
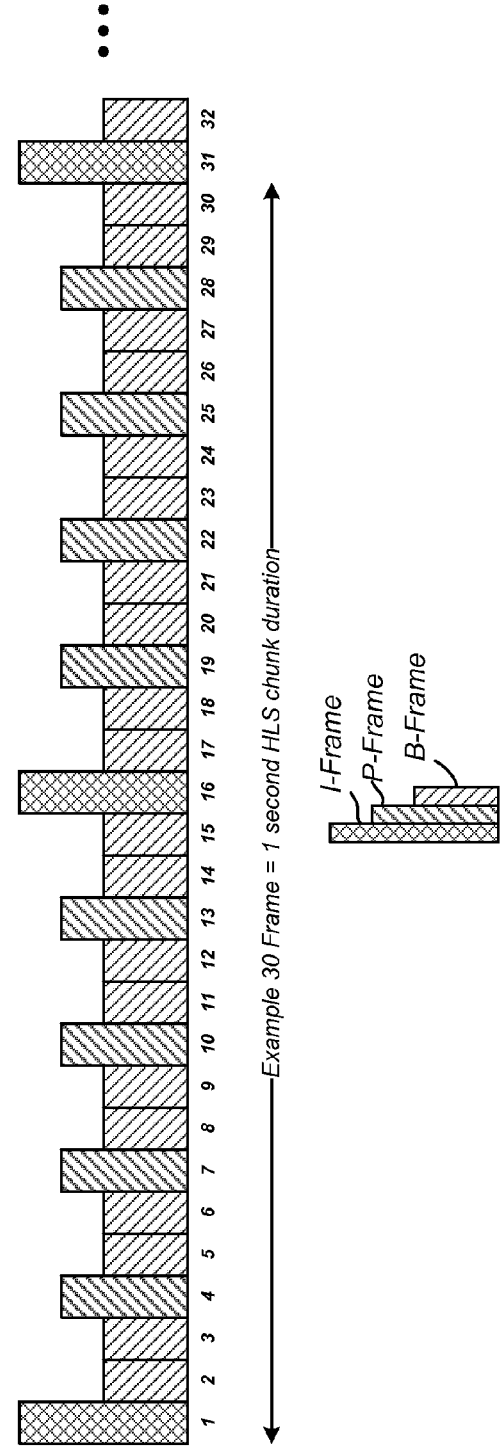

FIGS. 4A and 4B are diagrams illustrating decimation from a 720p60 native CPT stream to an AVC p30 output. Note that in both cases, some incoming native CPT I-frames do not fall on output frame locations of the transcoded stream. This has the effect of allowing almost unlimited gaps between output I-frames if the transcoder only uses input I-frames as output I-frame locations.

However, in a completed recording, (input) I-frames are really needed to provide seek points, and this first technique allows the client device 110 to seek to any input I-frame, because the transcoder 104 cannot start up and decode without an I-frame in its input data. At the same time, as described above, chunks should not be so large as to prevent good seek behavior, and an HLS client 110 cannot typically request (e.g. seek) anything but a chunk.

Figure 5A:
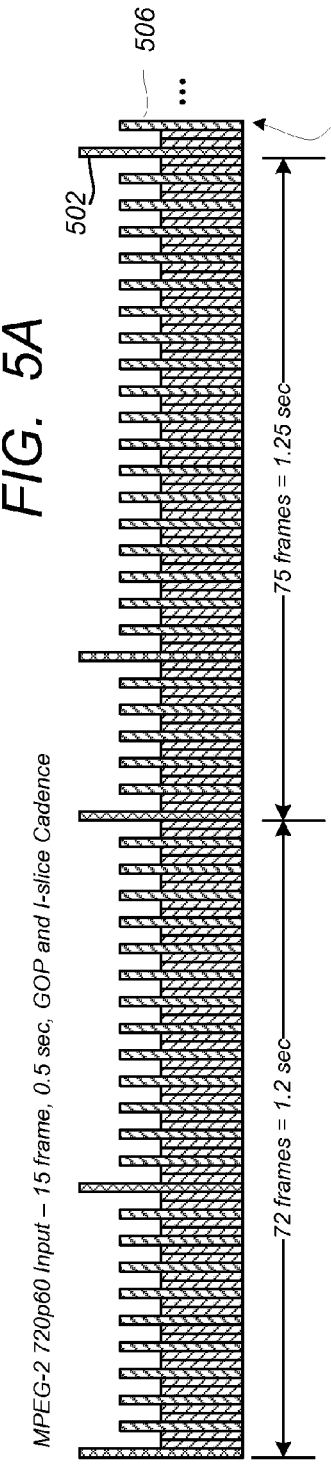
FIGS. 5A-5C are diagrams illustrating two techniques for transcoding the native CPT stream into chunks.
Figure 5B:
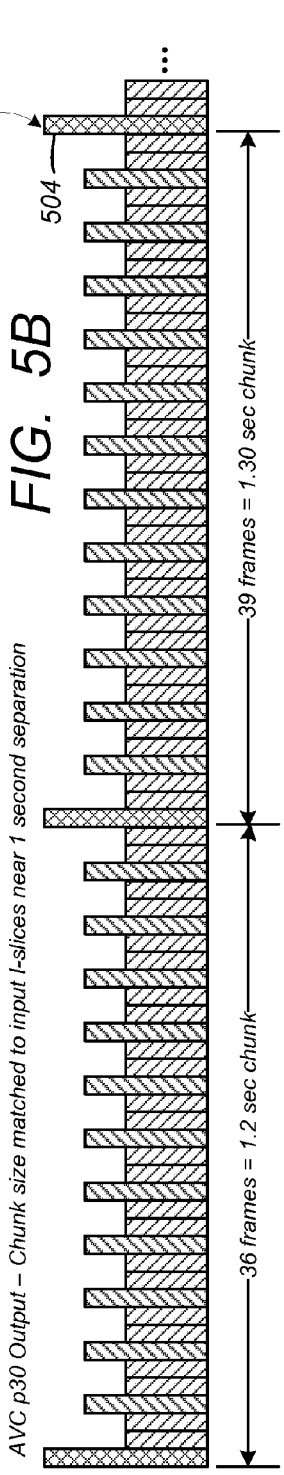
Figure 5C:
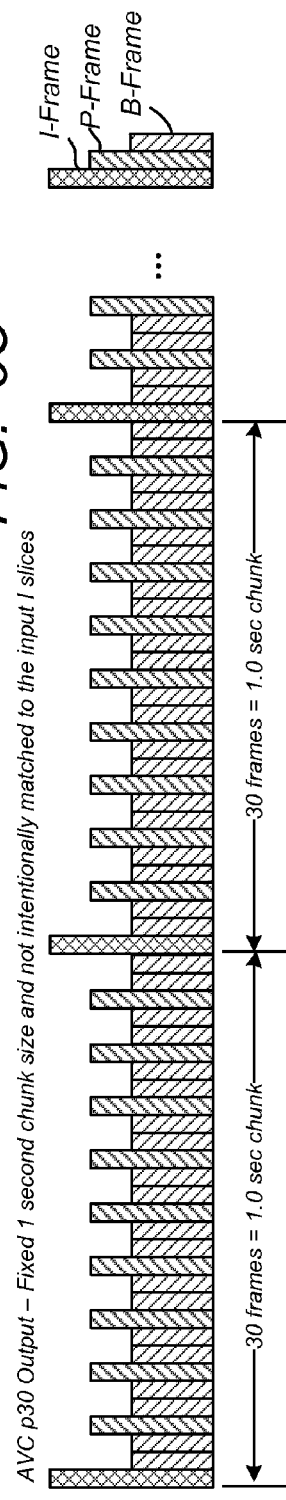

FIGS. 5A-5C are diagrams illustrating two techniques for transcoding the native CPT stream into chunks. FIG. 5A depicts the native CPT stream, while FIG. 5B depicts the above-described method of generating HLS chunks matched or nearly matched to the I-frames of the native CPT stream. Note that if the chunks are chosen to begin at each I-frame (not depicted), chunks will be relatively short (under one second) and of variable temporal duration. Note also that if the chunks are chosen to begin at an I-frame of the native CPT stream, by skipping any I-frame closer than a one second interval to the prior I-frame (as depicted in FIG. 5B), the chunk length is at least one second long. Note also that it is also possible to generate chunks that are of a particular temporal resolution (in the illustrated embodiment, for example, 0.1 second) by converting the closest number P-frame to the desired I-frame in the HLS chunk. This is illustrated in FIG. 5B step 508 in which input I-frame 502 of FIG. 5A is at an odd location for the transcoder to convert to an output I-frame in the output Group-Of-Pictures (GOP) structure. The transcoder can find the next closest P-frame, e.g., P-frame 506 of FIG. 5A that aligns with the transcoded output GOP cadence and convert it to I-frame 504.

This technique may result in temporally short chunks (e.g. less than one second), but such short chunks can be prevented by configuring the transcoder 104 to skip any I-frame closer to the prior I-frame by the desired minimum chunk size (in the above example, one second). The result would assure HLS chunks of a minimum size in bytes, by decreasing the number of I-frames from that in the pre-converted stream, as I-frames are less compressed than P or B-frames.

This technique may also result in very large chunks (e.g. 20 seconds or more) if the native CPT stream is not lively (resulting in I-frames temporally spaced widely apart), and may also result in all chunks being about 1 second in length, in the case where the native CPT stream includes a large number of evenly spaced I-frames that are temporally close together.

The problem of very large chunks can be ameliorated by setting the transcoder to cue generation of I-frames in the transcoded output to the I-frames in the native CPT stream as shown in FIG. 5B, but to also insert I-frames when too many P or B-frames are encountered without an interim I-frame. In such a case, the large chunk can be segmented to generate smaller chunks by generating an I-frame from a P-frame in the native CPT stream, as in step 508 of FIG. 5B, and labeling the EXT_INF duration as 1 or 2 seconds. This will be close enough to accurate so that the client player can function correctly in terms of seek and chunk duration.

FIGS. 6A and 6B are diagrams illustrating the generation of the I-frame from the P-frame. This may be accomplished by transcoding the native CPT stream shown in FIG. 6A beginning with an incoming I-frame 602. The processing of the incoming CPT stream continues over the next N frames of the CPT stream, producing a sequence of B and P-frames. If no I-frame is found in the next M frames, choosing the temporally next P-frame and converting that P-frame (e.g. frame 604) into an I-frame (e.g. frame 606). N is chosen to assure a minimum chunk size, while M is chosen limit the maximum chunk size. This results in an I-frame interval between N and N+M+3 frames. If N=55, M=7, the I-frame interval will be between 56 and 65 frames, with an average closer to 62, approximately, and EXT_INF can be labeled as 2 seconds.

Second Chunk Generation Technique

Decoupling Chunk Transitions from I Frames of the Native CPT Stream

FIG. 5C is a diagram depicting the second chunk generation technique. In this technique, the chunk boundaries are completely decoupled from the boundaries of the native stream. Hence, the chunk boundaries are no longer tied to the I-frames in the native CPT stream. This allows the transcoder 104 to be configured to generate I, P, and B-frames to provide for the best compression efficiency. This also avoids temporally lengthy I-frame spacing and allows segmentation of the native CPT stream into chunks of substantially constant temporal duration (for example, 10 seconds). As further described below, the substantially constant temporal duration assists in generating the playlist, in responding to seek commands from the client player 110. That is because the substantially unchanging temporal duration of each chunk allows the relationship between chunk boundaries and time points within the native CPT stream to be inferred without transmitting information regarding the temporal duration of each individual chunk in the playlist). In the illustrated embodiment, every generated HLS chunk begins with an I-frame.

The foregoing techniques may result in a chunk that does not end at the same temporal point as the ending of the native CPT stream. This can be handled in a number of ways. In one embodiment, this final HLS chunk can simply be extended to the temporal location of the end of the native CPT stream. In another embodiment, an "extra" chunk can be generated and included in the playlist, and then this extra HLS chunk can be supplied as the remaining content (which could comprise a series of black frames). In still another embodiment, an empty null file may be employed. Although the client device 110 player will attempt to obtain the null file and not receive it, this does not cause problems for most client player devices 110 (including iOS 6 devices), since the media file has concluded playing in the previous chunk).

Other Chunk Generation Techniques

HLS chunk and playlist generation techniques can also combine the two approaches above. For example, the first approach could be used for any 30 fps native input CPT stream format (for example, 1080i and 480i) and the second approach could be used for any 60 fps input CPT stream format, such as 720p60. Further, the stream generator 108 can choose chunk boundaries for 720p coded inputs that are "close" to input I-frames, for more predictable gateway responses to seek commands from the gateway 100.

Handling Seek Requests

Returning to FIG. 2, a client device seek request is received by the gateway 100, as shown in block 210. The client seek request is a request to play the CPT stream beginning at a temporal location selected by the client device 110. In response to the request, the gateway 100 searches to find the I-frame nearest the selected temporal location, as shown in block 212, and generates further (new) HLS files beginning at the nearest I-frame of the native CPT media stream, as shown in block 214. Finally, these new chunks are thereafter transmitted to the client device 110, as shown in block 216.

FIG. 7A-7C are diagrams further illustrating the generation of further HLS chunks in response to a client request. FIG. 7A depicts the native CPT stream, while FIG. 7B depicts the native CPT stream transcoded using the second technique described above, resulting in HLS chunks of substantially constant duration. When the client 110 seeks to chunk N+1, the nearest I-frame in the source CPT to the beginning of the N+1 chunk (e.g. I-frame 702) is searched for using the index, and used to begin the creation of new chunks, including chunk N+1 and N+2 illustrated in FIG. 7C. The temporal location of chunk N+1 will be offset from the previously generated N+1 chunk by an amount between the temporal location of the transcoded I-frame of the chunk that was sought to and the I-frame of the I-frame of the native CPT stream used to begin transcoding. Hence, the temporal boundaries of the new chunks may differ from the previously generated chunks by +/− half of the chunk length, but the overlap/shortfall can be handled by the client device 110 by buffering or similar techniques. Ending the final nominal ten second chunk early or late (because of the time shift in the new chunks) does not affect client playback device 110 performance. New chunks then adopt the identities and addresses of the chunks that were originally generated, so the playlist need not be updated.

The process of searching the CPT stream illustrated in FIG. 7A for an I-frame nearest the temporal location selected by the client device 110 can be accomplished by searching the index generated by the gateway 100 for an I-frame temporally closest to the temporal location selected by the client. In one embodiment, the temporally first frame of the new HLS chunks or files shown in FIG. 7C is a further I-frame 706 temporally beginning at the temporal location of the I-frame 702 nearest the selected temporal location. In the illustrated embodiment, the client device 110 can only seek to chunk boundaries and has chosen to seek to the beginning of chunk N+1. Since the first frame 708 of chunk N+1 is not aligned in time with an I-frame of the native CPT stream, the transcoder 104 chooses the closest I-frame 702 to begin transcoding the new HLS chunks, which begin with I-frame 706 of new chunk N+1, as shown in FIG. 7C. This results in a chunk offset (illustrated between the selected temporal location and the temporal location of the nearest I-frame of the CPT stream). This chunk offset will continue for the remainder of the generated further plurality of chunks, as each chunk generated thereafter are of constant temporal duration. In this illustrated embodiment, the nearest I-frame of the CPT stream follows the selected temporal location.

Figure 8A:
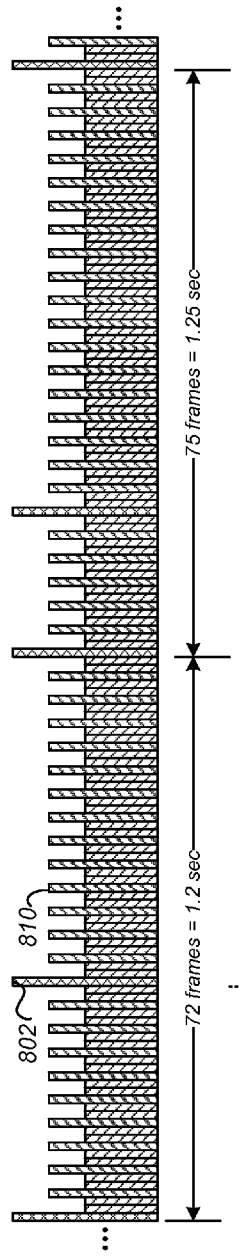
FIG. 8A-8C are diagrams further illustrating the generation of further HLS chunks in response to a client request, wherein the nearest I-frame of the CPT stream precedes the selected temporal location of the request.
Figure 8B:
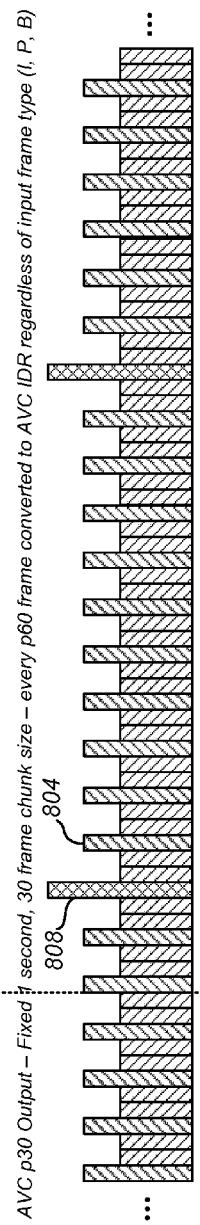
Figure 8C:
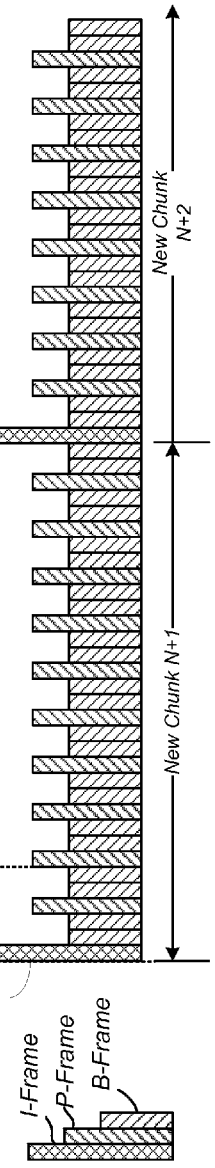

FIG. 8A-8C are diagrams further illustrating the generation of further HLS chunks in response to a client request, wherein the nearest I-frame of the CPT stream precedes the selected temporal location of the request. In this case, the client has also chosen to seek to the beginning of chunk N+1, and since the first frame 808 of chunk N+1 is not aligned in time with an I-frame of the native CPT stream, the transcoder 104 chooses the closest I-frame 802 to begin transcoding the new HLS chunks, which begin with I-frame 806 of new chunk N+1, as shown in FIG. 8C. This also results in a chunk offset that will continue for the remainder of each of the generated further plurality of chunks. In this embodiment, the I-frame closest to the selected temporal location precedes the selected temporal location.

The aforementioned chunk offsets can be minimized by transcoding the new HLS chunks such that the I-frame of the new chunk N+1 is generated at least in part from the nearest P-frame of the native CPT stream. In this case, the chunk offset shown in FIG. 7C would be reduced or eliminated, and the first I-frame 706 of new chunk N+1 is generated from P-frame 710. Thus, the first of the plurality of new HLS chunks begins temporally at or near the temporal location of the P-frame 710 of the CPT stream temporally near the selected temporal location (e.g. the beginning of chunk N+1).

FIGS. 9A-9C and 10A-10C are diagrams illustrating another technique of handling chunk offsets. In this technique, the transcoder 104 is set to extend or contract the temporal length of the first of the further generated chunks in the chunk offset amount so that the resulting transitional chunk ends on the same boundary as the previously generated chunks. For example, referring to the transcoder 104 is set so that the last frame 902 of new chunk N+1 is temporally adjacent to the last frame 904 of chunk N+1, as shown in FIGS. 9B and 9C, or so that the last frame 1002 of new chunk N+1 is temporally adjacent to the last frame 1004 of chunk N+1. This relieves the transcoder 104 of the need to generate new chunks in response to the seek request. Instead, after the transitional chunk is served to the client, the previously generated chunks (e.g. chunks N+2 shown in FIGS. 9B, 9C, 10B and 10C) may be served. In this embodiment, all of the chunks except the transitional chunk are of the same temporal duration.

The use of HLS chunks of substantially the same temporal length also simplifies the process of searching the CPT steam to find an I-frame nearest the temporal location of the client 110 seek request. That is because the temporal duration of each of the HLS chunks is known, and the temporal relationship between the boundaries of those chunks and I-frames in the CPT stream can be more easily determined than if the chunks were of differing temporal length. For example, when a client 110 request for a particular chunk is received due to a seek command, a time reference for the temporal beginning of that chunk (e.g. the temporal location of frame 708 of FIG. 7B) can be determined from the sequential location of the requested chunk among the chunks defined in the playlist. In the parlance of the example shown in FIGS. 7A-7C, the gateway 100 can determine the temporal location the beginning of client requested chunk N+1 because the gateway 100 knows the order of each one of the chunks, and that each chunk is of the same temporal duration. For example, if a playlist of 100 chunks is generated and the client device 110 requests chunk 2, the gateway can determine the time reference for the beginning of the first chunk (I-frame 708), and compute the equivalent time reference within the native CPT stream shown in FIG. 7A. The nearest I-frame 702 in the native CPT stream can then be simply determined by computing the distance of that equivalent time reference to the temporal location of each of the I-frame locations in the index, and selecting the I-frame that is the shortest temporal distance away. Further, if desired, the gateway 100 can limit the selected I-frame to ones occurring either before or after the equivalent time reference by simply disregarding I-frames with negative (or positive) temporal distances.

The regeneration of the new chunks described above is particularly useful for live streaming paradigms, because when media programs are live streamed, the gateway generates only a limited number of chunks at a time. Since the playlist may not be completely constructed in advance, a rolling playlist that describes the last M chunks is typically provided. In gateways 100 that do not implement a live on demand (LOD) buffer, M is typically 3, but in embodiments having a LOD buffer, the rolling playlist may be much larger. Thus the playlist is constructed from chunks that "could" be produced after transcode.

Acquisition Time of Adaptive on Demand Streaming of Completed Recordings

A basic premise of adaptive on demand streaming of complete recordings stored on the memory device 106 the recording must be recalled from the memory device, transcoded, encrypted, then prepared into HLS media chunks. The processing time required for such operations is similar to that for the replay of live streams, and this causes a significant delay. To minimize this delay, transcoded content may be served to clients as it is generated, and not grouped into chunks before providing the data to the client. Even if the processing time required for the grouping process were instantaneous, such grouping would add, at a minimum, the chunk temporal duration to the acquisition time. Acquisition time can be decreased by trickling out the transcoded data in very small chunks (e.g. a few bytes at a time), but this would negatively affect the ability to measure transmission channel performance via data group transit time measurements, as such measurements will be disguised by other factors, and of little use. As a compromise between such concerns, the data may be grouped into large enough quanta to measure channel rate, but small enough to allow an acceptable acquisition time. A suitably sized quanta is also necessary so that the rate control and resolution control that result from transmission channel measurements are provided as commands to the transcoder, has as rapid a response as possible. Huge HLS side buffers at the server would make this loop far slower, as the effect of a commanded change to bit rate or resolution would take more time to be realized on the channel. A quanta of 0.1 to 0.25 seconds, far less than a chunk size, has been identified as meeting these requirements.

Such quanta of data can still be organized into HLS chunks, the size of which is determined by seek requirements (e.g. granularity), because HLS does not typically offer seeking within a chunk, but rather seeking to a chunk. Chunk size of 10-30 seconds have been shown to work satisfactorily with data being provided in quanta of 0.1-0.25 seconds.

Adaptive streaming involves changing the transcoding parameters to adapt to changing client requirements and transmission channel bandwidth. Generally speaking, adaptation requires (1) a measurement of the transmission channel used to stream the data to the client (2) smoothing/filtering of the bandwidth measurements (3) feeding back the smoothed/filtered bandwidth measurement to control the transcoder bit rate and resolution settings, (4) temporal alignment of the segments of the quanta described above with HLS chunks or the index of segments stored in the memory 106, and (5) management of the buffering of the media stream in the memory 106 of the gateway if the client 110 requests a seek or pause functionality (portions of the memory used for this purpose are known as the live-on-demand, time-shift, or live-pause buffer. For example, if an iOS compliant client player device 110 issues a pause request, the client player device continues to download segments or chunks to fill it's playback buffer to about 50 seconds of temporal depth, and when play is resumed, the transcoder 104 must restart from and continue transcoding it's paused state.

Pausing of on-Demand Playback of Media Streams

When a client device pauses playback of an adaptively streamed media program, and resumes playback at a later time, the transmission channel characteristics may have changed in the interim. If this occurs, the transcoded data may be at too high of a bitrate for the transmission channel or too low of a bit rate to use available transmission capacity. Hence, it is advantageous for the transcoder to cease transcoding of the media stream when the client device 110 pauses playback of an adaptively streamed media program (otherwise, the gateway 100 would send out a media stream that was generated for channel transmission parameters that may no longer be valid).

At the same time, if transcoder 104 processing is suspended, it is important for the transcoder to be able to resume transcoding at the temporal point where it was suspended so that continuous video and audio is provided. Recalling that client playback devices 110 respond to pause commands by buffering up to one minute of content internally, it is possible that the transcoder's resume point is almost 60 seconds later than what the consumer is viewing in real time. Accordingly, the transcoder 104 should be able to store data allowing it to save or recover a state as much as 60 seconds in the past.

Hardware Environment

Figure 11:
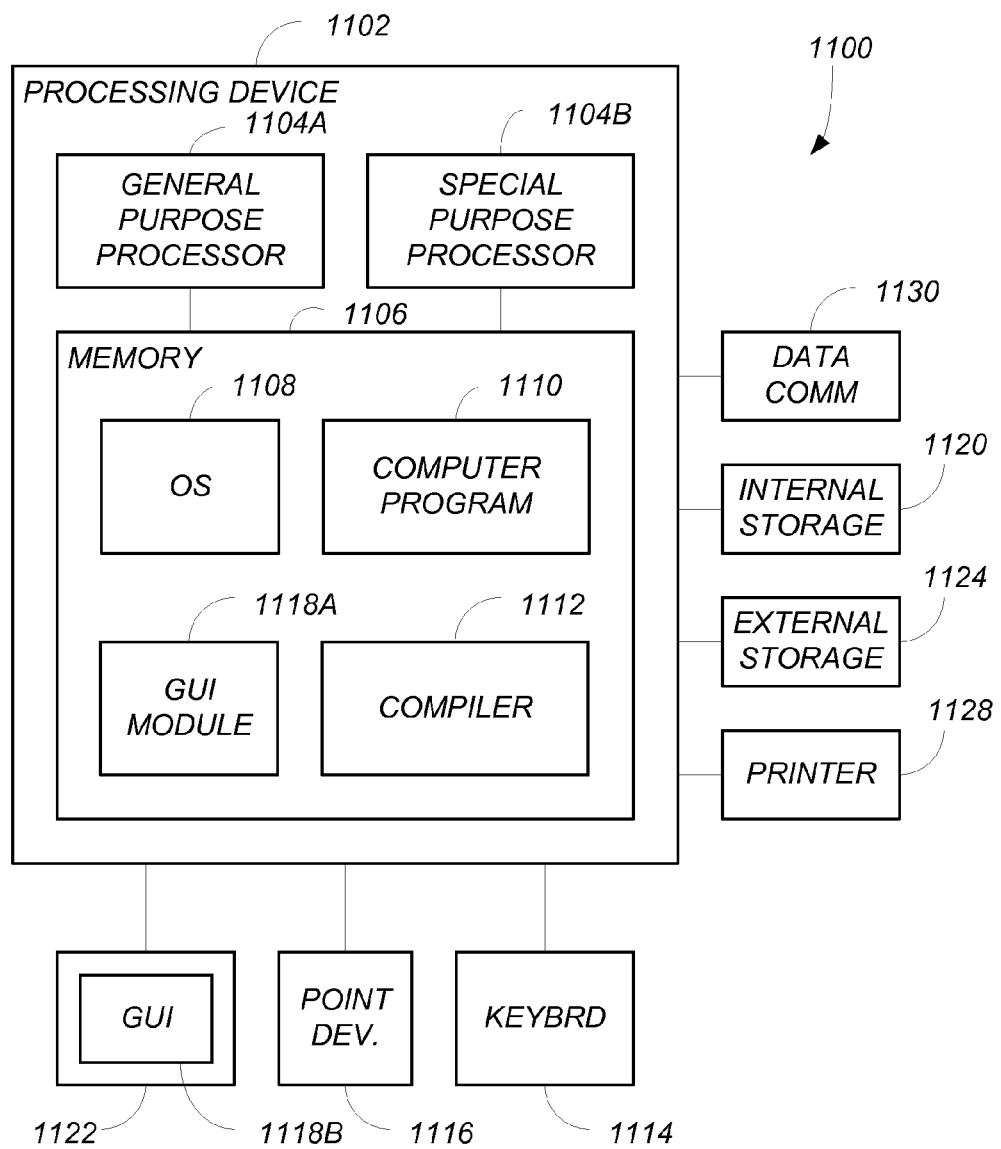
FIG. 11 is a diagram of an embodiment of a computer system that can be used to implement elements of the disclosed system, including the gateway.

FIG. 11 is a diagram illustrating an exemplary computer system 1100 that could be used to implement elements of the present invention, including elements of the gateway 100 and the client device 110. The computer system 1100 includes a processing device such as a computer 1102, which comprises a general purpose hardware processor 1104A and/or a special purpose hardware processor 1104B (hereinafter alternatively collectively referred to as processor 1104) and a memory 1106, such as random access memory (RAM). The computer 1102 may be coupled to other devices, including input/output (I/O) devices such as a keyboard 1114, a mouse device 1116 and a printer 1128.

In one embodiment, the computer 1102 operates by the general purpose processor 1104A performing instructions defined by the computer program 1110 under control of an operating system 1108. The computer program 1110 and/or the operating system 1108 may be stored in the memory 1106 and may interface with the user and/or other devices to accept input and commands and, based on such input and commands and the instructions defined by the computer program 1110 and operating system 1108 to provide output and results.

Output/results may be presented on the display 1122 or provided to another device for presentation or further processing or action. In one embodiment, the display 1122 comprises a liquid crystal display (LCD) having a plurality of separately addressable pixels formed by liquid crystals. Each pixel of the display 1122 changes to an opaque or translucent state to form a part of the image on the display in response to the data or information generated by the processor 1104 from the application of the instructions of the computer program 1110 and/or operating system 1108 to the input and commands. Other display 1122 types also include picture elements that change state in order to create the image presented on the display 1122. The image may be provided through a graphical user interface (GUI) module 1118A. Although the GUI module 1118A is depicted as a separate module, the instructions performing the GUI functions can be resident or distributed in the operating system 1108, the computer program 1110, or implemented with special purpose memory and processors.

Some or all of the operations performed by the computer 1102 according to the computer program 1110 instructions may be implemented in a special purpose processor 1104B. In this embodiment, some or all of the computer program 1110 instructions may be implemented via firmware instructions stored in a read only memory (ROM), a programmable read only memory (PROM) or flash memory within the special purpose processor 1104B or in memory 1106. The special purpose processor 1104B may also be hardwired through circuit design to perform some or all of the operations to implement the present invention. Further, the special purpose processor 1104B may be a hybrid processor, which includes dedicated circuitry for performing a subset of functions, and other circuits for performing more general functions such as responding to computer program instructions. In one embodiment, the special purpose processor is an application specific integrated circuit (ASIC).

The computer 1102 may also implement a compiler 1112 which allows an application program 1110 written in a programming language such as COBOL, C++, FORTRAN, or other language to be translated into processor 1104 readable code. After completion, the application or computer program 1110 accesses and manipulates data accepted from I/O devices and stored in the memory 1106 of the computer 1102 using the relationships and logic that was generated using the compiler 1112.

The computer 1102 also optionally comprises an external communication device such as a modem, satellite link, Ethernet card, or other device for accepting input from and providing output to other computers.

In one embodiment, instructions implementing the operating system 1108, the computer program 1110, and/or the compiler 1112 are tangibly embodied in a computer-readable medium, e.g., data storage device, which could include an internal storage device 1120 or external storage device 1124 in the form of one or more fixed or removable data storage devices, such as a zip drive, floppy disc drive, hard drive, CD-ROM drive, tape drive, or a flash drive. Further, the operating system 1108 and the computer program 1110 are comprised of computer program instructions which, when accessed, read and executed by the computer 1102, causes the computer 1102 to perform the steps necessary to implement and/or use the present invention or to load the program of instructions into a memory, thus creating a special purpose data structure causing the computer to operate as a specially programmed computer executing the method steps described herein. Computer program 1110 and/or operating instructions may also be tangibly embodied in memory 1106 and/or data communications devices 1130, thereby making a computer program product or article of manufacture according to the invention. As such, the terms "article of manufacture," "program storage device" and "computer program product" or "computer readable storage device" as used herein are intended to encompass a computer program accessible from any computer readable device or media.

Of course, those skilled in the art will recognize that any combination of the above components, or any number of different components, peripherals, and other devices, may be used with the computer 1102.

Although the term "computer" is referred to herein, it is understood that the computer may include portable devices such as cellphones, portable MP3 players, video game consoles, notebook computers, pocket computers, or any other device with suitable processing, communication, and input/output capability.

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching.

It is intended that the scope of the invention be limited not by this detailed description, but rather by the claims appended hereto. The above specification, examples and data provide a complete description of the manufacture and use of the apparatus and method of the invention. Since many embodiments of the invention can be made without departing from the scope of the invention, the invention resides in the claims hereinafter appended.

What is claimed is:

1. A method of providing a compressed packetized transport (CPT) stream to a client device via an HTTP live streaming (HLS) protocol having a plurality of HLS media files, comprising: generating an HLS playlist specifying a plurality of HLS media files before generating any of the HLS media files, wherein each of the plurality of HLS media files has a unique name; transmitting the HLS playlist to the client device; after generating the HLS playlist, transcoding the CPT stream into at least a subset of the plurality of HLS media files; and providing at least one of the subset of plurality of HLS media files to the client device, wherein the at least one of the plurality of HLS media files is a client-requested media file selected from the HLS playlist; wherein transcoding the CPT stream into at least a subset of the plurality of HLS media files comprises: transcoding a first I-frame of the CPT stream into a first HLS media file I-frame; transcoding N frames of the CPT stream temporally following the first I-frame of the CPT stream into first HLS media file P-frames and B-flames; for each the frames of the CPT stream temporally following the N frames:
   (a) transcoding an I-flame of the CPT stream to a subsequent HLS media file I-frame or a non-I-frame of the CPT stream to a subsequent HLS media P-frame or B-frame; (b) determining if the subsequent HLS media file frame is an I-frame; (c) if the subsequent HLS media frame is an I-frame, outputting the subsequent HLS media frame as the first I-frame of a second HLS media file subsequent to the first HLS media file; (d) if the subsequent HLS media frame is not an I-frame, determining if the subsequent HLS media frame is more than M frames subsequent from the first frame following the N frames of the CPT stream; (e) if the subsequent HLS media frame is not more than M frames subsequent from the first frame following the N frames of the CPT stream, repeating (a)-(e); (f) if the subsequent HLS media frame is more than M frames subsequent from the first frame following the N frames of the CPT stream, transcoding a next P-frame from the CPT stream temporally following the subsequent HLS media flame to an I-frame and outputting the I-frame as the first I-frame of the second HLS media file subsequent the first HLS media file.

2. The method of claim 1, wherein each HLS media file represents a segment of the compressed packetized transport stream of substantially the same temporal duration as other HLS media files representing other segments of the CPT stream.

3. The method of claim 2, further comprising:
   receiving a request from the client device for the CPT stream beginning at a selected temporal location selected by the client device;
   searching the CPT stream for an I-frame nearest the selected temporal location;
   transcoding the CPT stream beginning at the I-frame temporally nearest to the selected temporal location to produce a further plurality of HLS media files; and
   transmitting the further plurality of HLS media files to the client device.

4. The method of claim 3, wherein the client request for the CPT stream beginning at a selected temporal location selected by the client device comprises an identifier of a requested HLS media file, and searching the CPT stream for an I-frame nearest the selected temporal location comprises:
   computing a time reference for a beginning of the requested media file from the requested media file sequential location within the plurality of HLS media files derived from the HLS playlist and the substantially same temporal duration of HLS media files; and
   computing a time reference within the CPT media stream from the computed time reference and an index generated from the CPT media stream.

5. The method of claim 4, wherein the temporally first frame of the first of the plurality of further HLS media files is a further I-frame temporally beginning at the temporal location of the I-frame of the CPT stream nearest the selected temporal location.

6. The method of claim 5, wherein the temporally first frame of the first of the plurality of further HLS media files is a further I-frame temporally beginning at a temporal location of the I frame of the CPT stream nearest to and following the selected temporal location.

7. The method of claim 5, wherein the temporally first frame of the first of the plurality of further HLS media files is a further I frame temporally beginning at a temporal location of the I frame of the CPT stream nearest to and preceding the selected temporal location.

8. The method of claim 5, wherein the CPT stream comprises a temporally last frame, and the plurality of further HLS files comprises a last HLS file having frames temporally extended to the temporal location of the temporally last frame of the CPT stream.

9. The method of claim 1, further comprising:
   receiving a request from the client device for the CPT stream beginning at a selected temporal location selected by the client device;

searching the CPT stream for an I-frame nearest to and preceding the selected temporal location;

generating a transitional HLS media file by transcoding the CPT stream beginning at an I-frame of the CPT stream nearest to and preceding the selected temporal location; and providing the transitional HLS media file to the client device;

wherein each HLS media file except the transitional HLS media file represents a segment of the compressed packetized transport stream of substantially the same temporal length as other HLS media files representing other segments of the CPT stream.

10. The method of claim 1, wherein:

the CPT media stream comprises a plurality of frames including I-frames having P-frames and B-frames therebetween; and each of the plurality of HLS media files comprises one or more transcoded I-frames and a plurality of transcoded P-frames and transcoded B-frames, wherein:

at least one transcoded I-frame is at or near the temporally first frame of each HLS media file; and at least one of the transcoded I-frames of one of the plurality of HLS media files is converted from a CPT P-frame of the media stream.

11. An apparatus for providing a compressed packetized transport (CPT) stream to a client device via an HTTP live streaming (HLS) protocol having a plurality of HLS media files, comprising: a processor; a memory, coupled to the processor, the memory storing processor instructions comprising instructions for: generating an HLS playlist specifying a plurality of HLS media files before generating any of the HLS media files, wherein each of the plurality of HLS media files has a unique name; transmitting the HLS playlist to the client device; after generating the HLS playlist, transcoding the CPT stream into at least a subset of the plurality of HLS media files; and providing at least one of the subset of plurality of HLS media files to the client device, wherein the at least one of the plurality of HLS media files is a client-requested media file selected from the HLS playlist; wherein the instructions for transcoding the CPT stream into at least a subset of the plurality of HLS media files comprise instructions for: transcoding a first I-frame of the CPT stream into a first HLS media file I-frame; transcoding N frames of the CPT stream temporally following the first I-frame of the CPT stream into first HLS media file P-frames and B-frames; for each the frames of the CPT stream temporally following the N frames: (a) transcoding an I-frame of the CPT stream to a subsequent HLS media file I-frame or a non-I-frame of the CPT stream to a subsequent HLS media P-frame or B-frame; (b) determining if the subsequent HLS media file frame is an I-frame; (c) if the subsequent HLS media frame is an I-frame, outputting the subsequent HLS media frame as the first I-frame of a second HLS media file subsequent to the first HLS media file; (d) if the subsequent HLS media frame is not an I-frame, determining if the subsequent HLS media frame is more than M frames subsequent from the first frame following the N frames of the CPT stream; (e) if the subsequent HLS media frame is not more than M frames subsequent from the first frame following the N frames of the CPT stream, repeating (a)-(e); (f) if the subsequent HLS media frame is more than M frames subsequent from the first flame following the N frames of the CPT stream, transcoding a next P-frame from the CPT stream temporally following the subsequent HLS media frame to an I-frame.

12. The apparatus of claim 11, wherein each HLS media file represents a segment of the compressed packetized transport stream of substantially the same temporal duration as other HLS media files representing other segments of the CPT stream.

13. The apparatus of claim 12, wherein the instruction further comprise instructions for:

receiving a request from the client device for the CPT stream beginning at a selected temporal location selected by the client device;

searching the CPT stream for an I-frame nearest the selected temporal location;

transcoding the CPT stream beginning at the I-frame temporally nearest to the selected temporal location to produce a further plurality of HLS media files; and transmitting the further plurality of HLS media files to the client device.

14. The apparatus of claim 13, wherein the client request for the CPT stream beginning at a selected temporal location selected by the client device comprises an identifier of a requested HLS media file, and the instructions for searching the CPT stream for an I-frame nearest the selected temporal location comprise instructions for:

computing a time reference for a beginning of the requested media file from the requested media file sequential location within the plurality of HLS media files derived from the HLS playlist and the substantially same temporal duration of HLS media files; and computing a time reference within the CPT media stream from the computed time reference and an index generated from the CPT media stream.

15. The apparatus of claim 14, wherein the temporally first frame of the first of the plurality of further HLS media files is a further I-frame temporally beginning at the temporal location of the I-frame of the CPT stream nearest the selected temporal location.

16. The apparatus of claim 15, wherein the temporally first frame of the first of the plurality of further HLS media files is a further I-frame temporally beginning at a temporal location of the I frame of the CPT stream nearest to and following the selected temporal location.

17. The apparatus of claim 15, wherein the temporally first frame of the first of the plurality of further HLS media files is a further I frame temporally beginning at a temporal location of the I frame of the CPT stream nearest to and preceding the selected temporal location.

18. The apparatus of claim 15, wherein the CPT stream comprises a temporally last frame, and the plurality of further HLS files comprises a last HLS file having frames temporally extended to the temporal location of the temporally last frame of the CPT stream.

19. The apparatus of claim 11, wherein the instructions further comprise instructions for:

receiving a request from the client device for the CPT stream beginning at a selected temporal location selected by the client device;

searching the CPT stream for an I-frame nearest to and preceding the selected temporal location;

generating a transitional HLS media file by transcoding the CPT stream beginning at an I-frame of the CPT stream nearest to and preceding the selected temporal location; and providing the transitional HLS media file to the client device;

wherein each HLS media file except the transitional HLS media file represents a segment of the compressed packetized transport stream of substantially the same temporal length as other HLS media files representing other segments of the CPT stream.

20. The apparatus of claim 11, wherein:
the CPT media stream comprises a plurality of frames including I-frames having P-frames and B-frames therebetween; and
each of the plurality of HLS media files comprises one or more transcoded I-frames and a plurality of transcoded P-frames and transcoded B-frames, wherein:
- at least one transcoded I-frame is at or near the temporally first frame of each HLS media file; and
- at least one of the transcoded I-frames of one of the plurality of HLS media files is converted from a CPT P-frame of the media stream.

\* \* \* \* \*